US007516407B2

(12) United States Patent
Dabrowski

(10) Patent No.: US 7,516,407 B2
(45) Date of Patent: Apr. 7, 2009

(54) TIMELINE RANDOM ACCESS FOR MULTI-FORMAT TIME-BASED FILE RECORDING AND PLAYBACK

(75) Inventor: Stephen Dabrowski, Kentwood, MI (US)

(73) Assignee: General Electric Company, Schnectady, NY (US)

( * ) Notice: Subject to any disclaimer, the term of this patent is extended or adjusted under 35 U.S.C. 154(b) by 676 days.

(21) Appl. No.: 11/034,511

(22) Filed: Jan. 12, 2005

(65) Prior Publication Data

US 2005/0267656 A1 Dec. 1, 2005

Related U.S. Application Data

(60) Provisional application No. 60/575,490, filed on Jun. 1, 2004.

(51) Int. Cl.
*G06F 3/00* (2006.01)

(52) U.S. Cl. ........................ 715/720; 715/719; 715/721

(58) Field of Classification Search ................. 715/810, 715/716–732
See application file for complete search history.

(56) References Cited

U.S. PATENT DOCUMENTS

| | | | | |
|---|---|---|---|---|
| 3,946,364 | A | 3/1976 | Codomo et al. | |
| 4,604,711 | A * | 8/1986 | Benn et al. | 701/14 |
| 5,649,182 | A | 7/1997 | Reitz | |
| 5,717,869 | A * | 2/1998 | Moran et al. | 715/716 |
| 5,832,495 | A | 11/1998 | Gustman | |
| 6,038,522 | A | 3/2000 | Manson et al. | |
| 6,266,053 | B1 | 7/2001 | French et al. | |
| 6,320,598 | B2 | 11/2001 | Davis et al. | |
| 6,366,311 | B1 | 4/2002 | Monroe | |
| 6,393,347 | B1 | 5/2002 | Snyder et al. | |
| 2002/0004695 | A1 | 1/2002 | Glenn et al. | |
| 2003/0118087 | A1 | 6/2003 | Goldthwaite et al. | |
| 2004/0008253 | A1 | 1/2004 | Monroe | |
| 2004/0027368 | A1 | 2/2004 | Snyder et al. | |

FOREIGN PATENT DOCUMENTS

| | | |
|---|---|---|
| GB | 2 127 656 A | 4/1984 |

OTHER PUBLICATIONS

Microsoft, "Microsoft Windows XP—file Explorer Screenshots," 2001.*

Holt Technologies, "Holt Integrated Circuits—ARINC 429 Products," Archive date of Apr. 10, 2003.*

The CoPilot System, Software and Hardware Interfaces to Avionics Databuses, Ballard Technology, Inc. (3 pgs.).

* cited by examiner

*Primary Examiner*—Ba Huynh
(74) *Attorney, Agent, or Firm*—William Scott Andes

(57) ABSTRACT

A random access recording method and system for recording and playing back of avionics data, includes: storing data received from a plurality of data channels in respective data files. The method and system also includes storing timeline pointers that signify when the data from the respective plurality of data files was stored. The method and system further includes determining a particular position of a timeline icon provided on a graphical user interface (GUI) display, the timeline icon signifying a point in time that a user desires to review avionics data stored. The method and system still further includes playing back data stored based on the particular position of the timeline icon with respect to corresponding values of the timeline pointers stored.

29 Claims, 6 Drawing Sheets

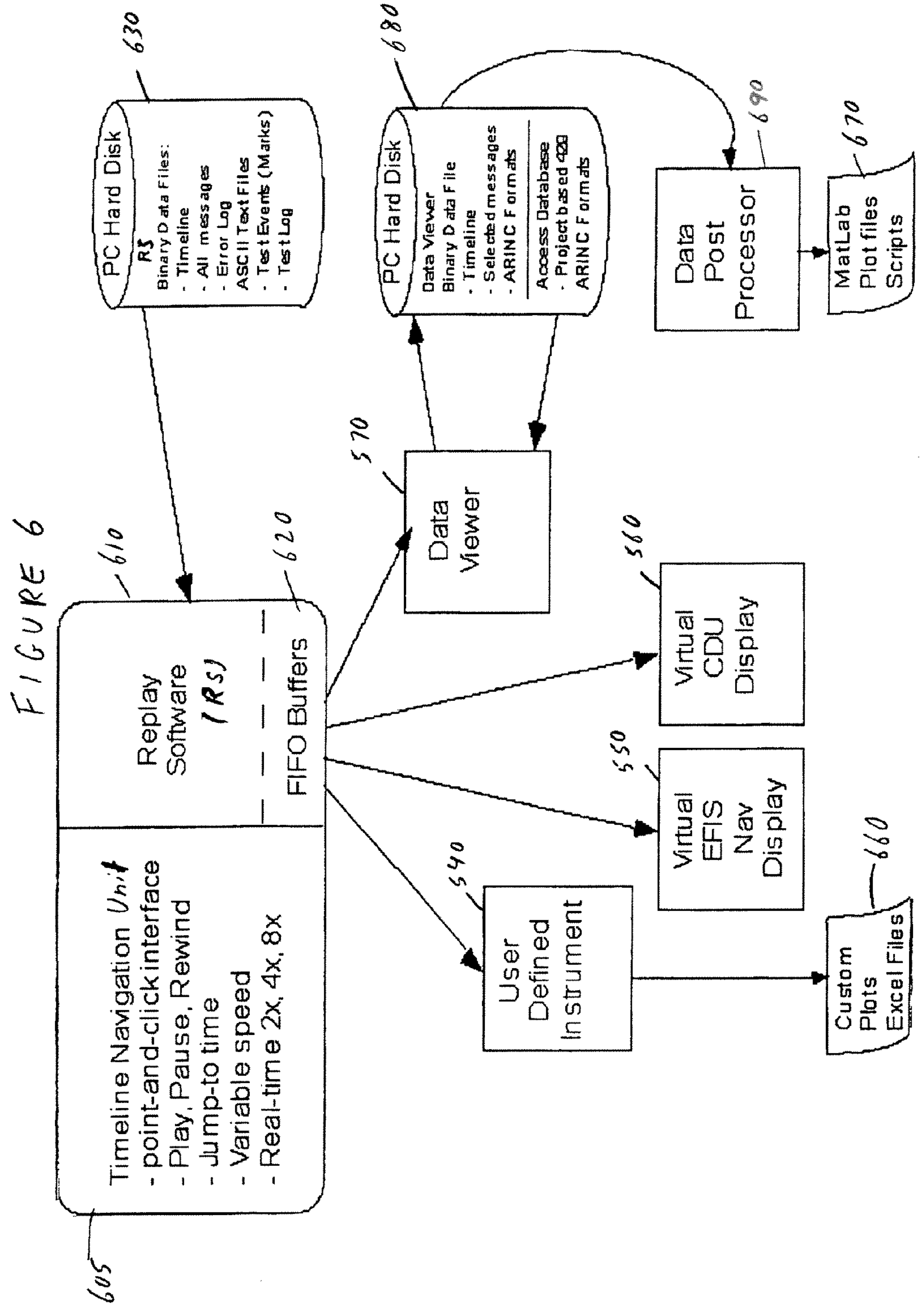
FIGURE 6
Timeline Navigation Unit
- point-and-click interface
- Play, Pause, Rewind
- Jump-to time
- Variable speed
- Real-time 2x, 4x, 8x
605
Replay Software (RS)
610
FIFO Buffers
620
PC Hard Disk
RS
Binary Data Files:
- Timeline
- All messages
- Error Log
ASCII Text Files
- Test Events (Marks)
- Test Log
630
Data Viewer
570
PC Hard Disk
Data Viewer
Binary Data File
- Timeline
- Selected messages
- ARINC Formats
Access Database
- Project based 429
ARINC Formats
680
Data Post Processor
690
MatLab
Plot files
Scripts
670
Virtual CDU Display
560
Virtual EFIS Nav Display
550
User Defined Instrument
540
Custom
Plots
Excel Files
660

TIMELINE RANDOM ACCESS FOR MULTI-FORMAT TIME-BASED FILE RECORDING AND PLAYBACK

RELATED APPLICATIONS

This application claims priority to provisional patent application Ser. No. 60/575,490, entitled Timeline Random Access for Multi-Format Time-Based Data File Recording and Playback, filed Jun. 1, 2004, which is incorporated in its entirely herein by reference.

BACKGROUND OF THE INVENTION

The present invention relates generally to recording and playback of data, and in particular, to the recording and playback of aircraft data.

Recording and playback of aircraft data is important for many purposes, such as for determining the operational state of an aircraft, or for determining the cause of an aircraft accident.

The ARINC standard is utilized for aircraft data acquisition and playback. Conventional personal computer interface cards, such as conventional ARINC 429 interface cards, provide software that allows recording and playback of avionics data, whereby that data cannot be recorded or played back in a random access manner. This leads to difficulty in reviewing aircraft data in real time or at a later point in time.

SUMMARY OF THE INVENTION

One aspect of the invention relates to an avionics system that allows for recording of avionics data that provides for playback of that data in a random access manner.

According to that at least one aspect of the invention, there is provided a recording method and system for recording and playing back of avionics data, which includes storing data received from a plurality of data channels in respective data files. The method and system also includes storing timeline pointers that signify when the data from the respective plurality of data files was stored. The method and system further includes determining a particular position of a timeline icon provided on a graphical user interface (GUI) display, the timeline icon signifying a point in time that a user desires to review avionics data stored. The method and system still further includes playing back data stored based on the particular position of the timeline icon with respect to corresponding values of the timeline pointers stored.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 6 is a block diagram showing a data playback system according to an embodiment of the invention.

DETAILED DESCRIPTION OF THE PREFERRED EMBODIMENTS

In the following description, for the purposes of explanation, numerous specific details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

Computer graphical user interface (GUI) timelines are ubiquitous for accessing video or audio computer files. The present invention utilizes a single uniform timeline referenced data file to access multiple non-uniform data file pointers, thereby allowing random navigation of multiple avionics data files. Because these individual data files can have any format or structure, the present invention can be used to provide synchronization and access of dissimilar data formats.

Because there is no need to track the contents of individual data files, the use of a single pointer file in accordance with a first embodiment of the invention provides a uniform method of queuing data for playback either in real time or near real time, or at a later time for analysis purposes. The first embodiment will be described for use with ARINC 429 avionics bus traffic, but one skilled in the art will recognize that the first embodiment can be utilized with other types of data, such as video, audio, or other avionics formats (e.g., AFDX, 1553, 1394).

Conventional avionics data recording and playback systems use the known format of the data files to parse the data during playback. The first embodiment of the present invention does not depend on the particular format of the data files, and whereby it also allows re-synchronization and random access of multiple formats without regard to file contents.

Figure 1:
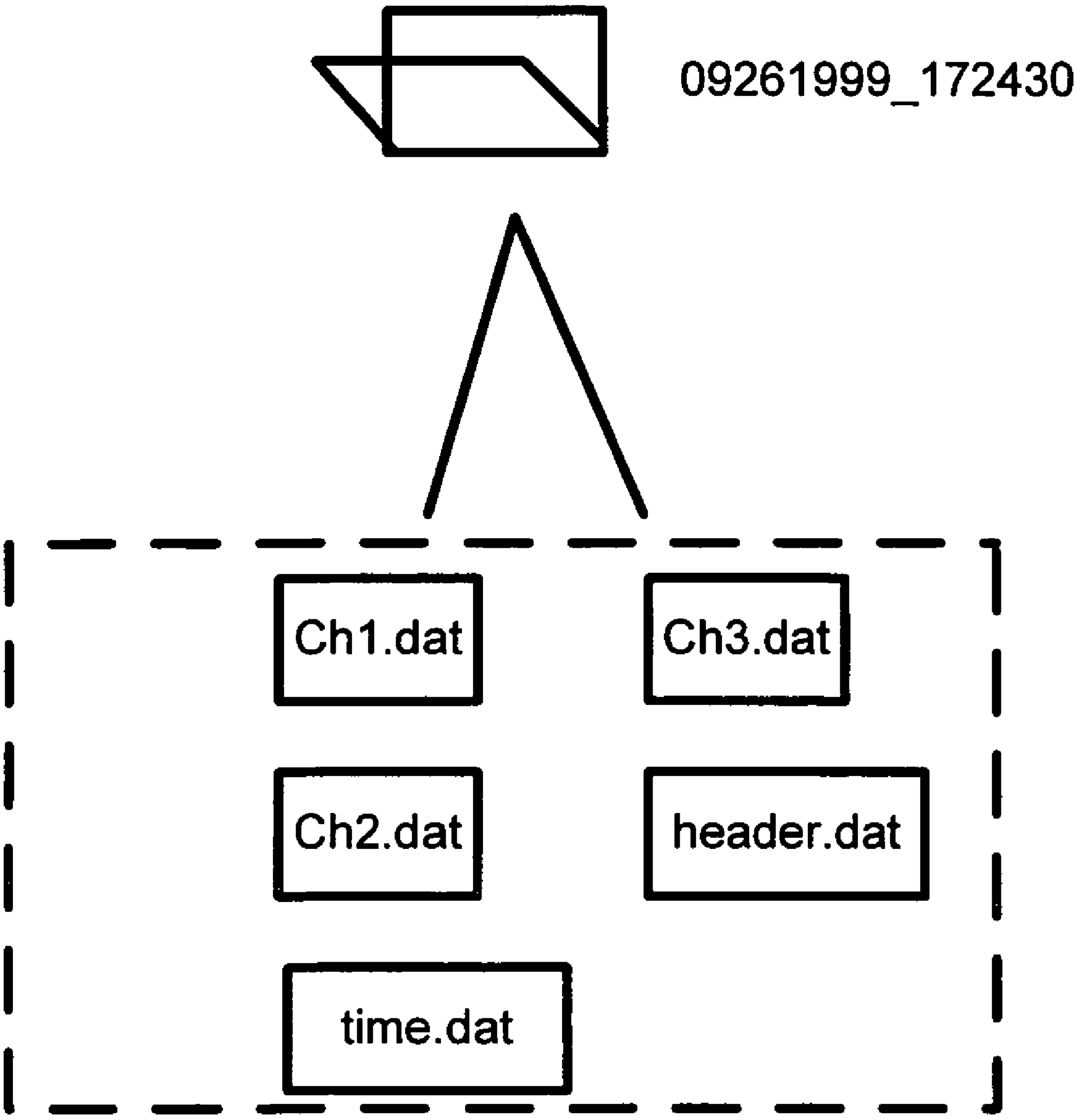
FIG. 1 is a diagram showing a data file structure according to an embodiment of the invention.

A first embodiment of the invention will be described with reference to FIG. 1, which shows a directory structure. The main file folder is identified by date and time; for example, in FIG. 1, the main file folder is for Sep. 26, 1999, at 1700 hours, 24 minutes and 30 seconds. That time may correspond to the beginning of storage of data from an aircraft for a particular flight, for example. Within the main file folder are several data files. One data file is a header file, header.dat, which contains database format information that is used to convert data messages of a particular format (e.g., ARINC 429 format) into engineering values. The main file folder also includes a file for each of a plurality of channels that respectively provide data from a particular component of an aircraft. In FIG. 1, there are sixteen (16) data channels, and thus there are at most 16 channel files (ch1.dat, ch2.dat, ch3.dat, etc.) in the main file folder. Each of these 16 channel files contains an ARINC message data stream for its particular data channel. Lastly, the main file folder contains a timeline file, time.dat, which contains a time-based index into the channel files.

The fundamental operation of a loss-free SBS ARINC data collection is based on an Interrupt Service Routine and an SBS Channel Sequencing Monitoring function. The SBS interface card has at least two sequential monitor buffers for each channel. As each message is received by the SBS interface card, that message is placed in one of the two buffers, along with a time tag. In a preferred implementation of the first embodiment, each message is a 32-bit ARINC 429 message, and each time tag is a 48-bit time tag. One of ordinary skill in the art will recognize that different size messages and time tags may be envisioned while remaining within the spirit and scope of the present invention.

When the buffer receiving the data is filled up with data, the SBS interface card automatically swaps the data in that buffer with the other buffer of the SBS interface card, and a service request action is triggered based on this event. A host computer service routine monitors for such events, and extracts the data from SBS interface card, and writes the data into the appropriate channel's data file (e.g., ch3.dat).

The size of the sequential monitor buffer creates a "write block unit" that includes a fixed number of words per message. In the preferred implementation of the first embodiment, a write block unit corresponds to five 16-bit words per message. Of course, one of ordinary skill in the art will recognize that other sizes for the write block unit may be contemplated while remaining within the spirit and scope of the present invention.

The time-aligned messages do not need to be in any particular label order, and there is no restriction that labels will not repeat or be missing entirely from a given "write block unit." In other words, there is no special meaning to a write block unit other than each time a channel interrupt occurs, the data file will be updated with an amount of data corresponding to a write block unit.

In the first embodiment, data from the 16 channels are respectively kept in separate data files, in order to simplify the data extraction process and to reduce the file overhead when replaying the data files. Only the channels that need decoding are opened and read during a playback session, based on the user's intent (e.g., the user's desire to only review the data from channels 5 and 8). The channel independence of these separate data files allows many channels of widely different data fill rates to be handled within a single time index. Data is written as it is received, and individual message time-lags allow complete event reconstruction of separate channels on a common timeline. Thus, a user may wish to reconstruct an event by reviewing the data from channels 1, 8 and 16 during a particular one hour period in the middle of an eight-hour flight of an aircraft, whereby this can be done relatively simply utilizing the system and method according to the first embodiment.

In a preferred implementation of the first embodiment, the sequential monitor buffer size on the SBS interface card is given by 9+8 times the number of messages per buffer, whereby this value is changeable based on the particular system being configured. This value is specified when the SBS 429 interface card is initialized. It is preferred that a common value for this buffer be used for all channels to simplify code overhead. On the file storage side of the process, the write block unit in the data file is given by five times the number of messages per buffer, in the preferred implementation of the first embodiment.

The timeline file is an important aspect of the present invention, whereby it provides for the capability of random access to the data set. While data collection is underway, each channel's sequential monitor swap operation also updates that channel's file index, which, in a preferred implementation of the first embodiment, is a 64-bit file index. During data collection, the timeline file is updated periodically by writing the entire set of these individual channel's 64-bit file pointer indices. By way of example and not by way of limitation, the periodic updating is performed once per second. For each timeline increment, there will be sixteen 64-bit integers written into the timeline file in the preferred implementation of the first embodiment.

To access any random portion of a data set, the following steps are utilized: a) determine time offset from the beginning of a data collection session, b) divide that offset by the timeline file's period to find the index into the timeline file, c) open the timeline file and fseek to the timeline file record corresponding to the desired offset, d) read the sixteen 64-bit file indices from the timeline file, e) open the desired channel file and fseek to the individual "write block unit" record within that file, and f) begin reading the data sequentially from that point.

Additional processing steps are used to reconstruct the entire time history of the individual channels: a) for each channel of data, read and store the time-tag of the first message, b) time sort through all channel time-tags to find the earliest message, c) submit the earliest message to its associated data processing activity, d) read the next message from that earliest channel's data file, and e) repeat the "time sort" process until the end of all files or a specified upper time limit is reached.

The following provides exemplary file storage requirements for implementing the first embodiment of the present invention. Each ARINC 429 channel produces ten 8-bit bytes per message. A high-speed channel's highest data rate is 100,000 bits per second, with a minimum of 36 bits per message. The pertinent calculations are thus:

100,000 bits/sec*1 message/36 bits=2778 messages/sec 2778 messages/sec*10 bytes/message=27,778 bytes/sec Thus, a high-speed data channel consumes:

27,778 bytes/sec*3600 sec/hr*1 Mbyte/1024*1024 bytes=95.367 Mb/hour

While a low-speed channel, one-eighth of the high-speed rate, consumes:

95.367 Mb/hr*12500 bps/100,000 bps=11.921 Mb/hour

For a single channel, at the highest theoretical message rate, the disk would fill at the maximum rate of:

1024 Mb/Gb*hr/95.367 Mb=10.737 hours/Gb

In general, for "x" low-speed and "y" high speed channels, the maximum theoretical fill rate becomes:

1024 Mb/Gb*(hr/(($y$*95.367)+($x$*11.921)Mb) (hr/Gb)

For 8 low-speed and 8 high-speed channels, the estimated record time becomes:

1024 Mb/Gb*(hr/((8*95.367)+(8*11.921)Mb)=1.193 hours/Gb

The computation values provided above are very conservative, whereby the 2778 message per second rate works out to just under three (3) messages per millisecond, which is far greater than a typical bus loading. A high-speed EFIS bus produces approximately 64 messages every 50 milliseconds, which is about 3½ times slower than the theoretical limit. Using that estimate across all channels results in a data storage rate of about four (4) hours per gigabyte for the 8 high-speed and 8 low-speed example, which is reasonable for current storage capabilities of computer disk drives.

Along with the data file storage, the timeline file, which is defined in the preferred implementation of the first embodiment to accommodate 16 channels, would grow at a rate of:

16 channels*8 bytes/(channel–time increment)* (1 time–increment/$X$ seconds)*3600 seconds/hr 460800 bytes/$X$ hours where "X" is the granularity of the timeline in seconds. If it is assumed that a one (1) second timeline is desired, then the fixed overhead to maintain random file access becomes:

460800 bytes/(1) hours*1 Mb/(1024*1024 bytes)= 0.439 Mb/hour

This value is relatively small in comparison to the data file fill rate, and is therefore not a major factor in storage requirements calculations.

Figure 2:
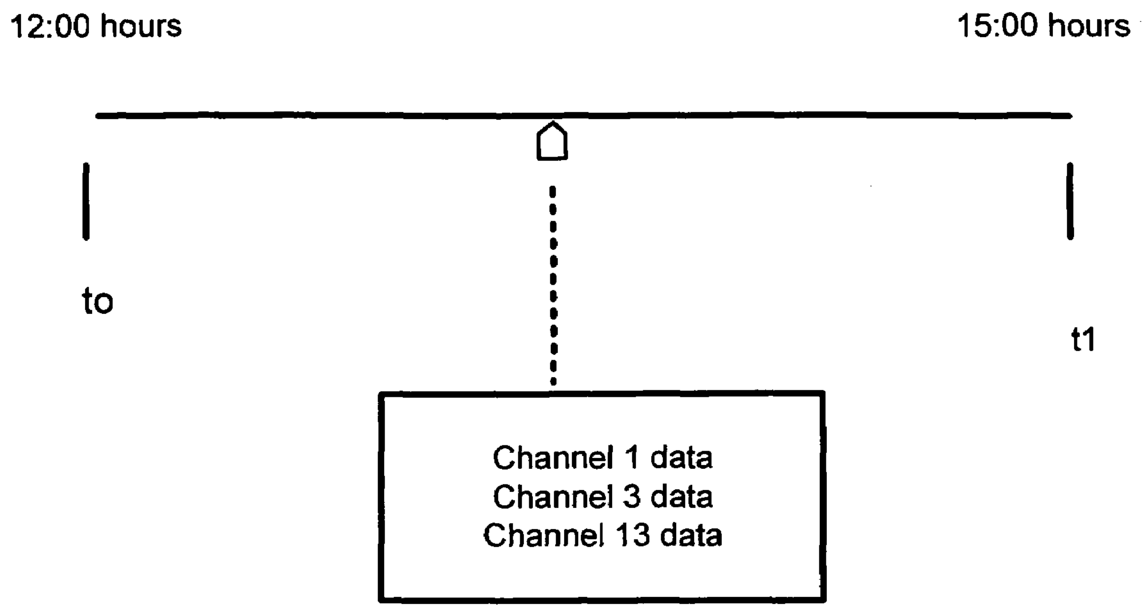
FIG. 2 is a diagram showing a timeline pointer that can be adjusted by a user, according to an embodiment of the invention.

It is envisioned that, in one possible implementation of the first embodiment, a user is provided with a GUI display, whereby the user can move a time line cursor to a particular moment in time, in order to playback data that was recorded for a particular flight of an aircraft. In FIG. 2, a timeline start position t0 corresponds to the start of flight, and a timeline end position t1 corresponds to the end of the flight. In this example, the flight was three hours long, whereby the user can move a cursor to obtain avionics information obtained during any particular portion of that flight, similar to how a user can play back an audio file using a Real Time Media™ player to play back an audio music file obtained from the Internet. When positioned at any particular location on the timeline, the user will be provided information (such as via a pop-up menu on the GUI display) as the particular channels that are providing data (which is being stored in respective channel files) at that moment in time. For example, for time instant corresponding to where the pointer is positioned in FIG. 2, the pop-up menu indicates that data was received (or is being received, for a real-time application) from data channels 1, 3 and 13, and whereby data from one or more of those channels can be monitored by the user by way of the GUI display.

Figure 3:
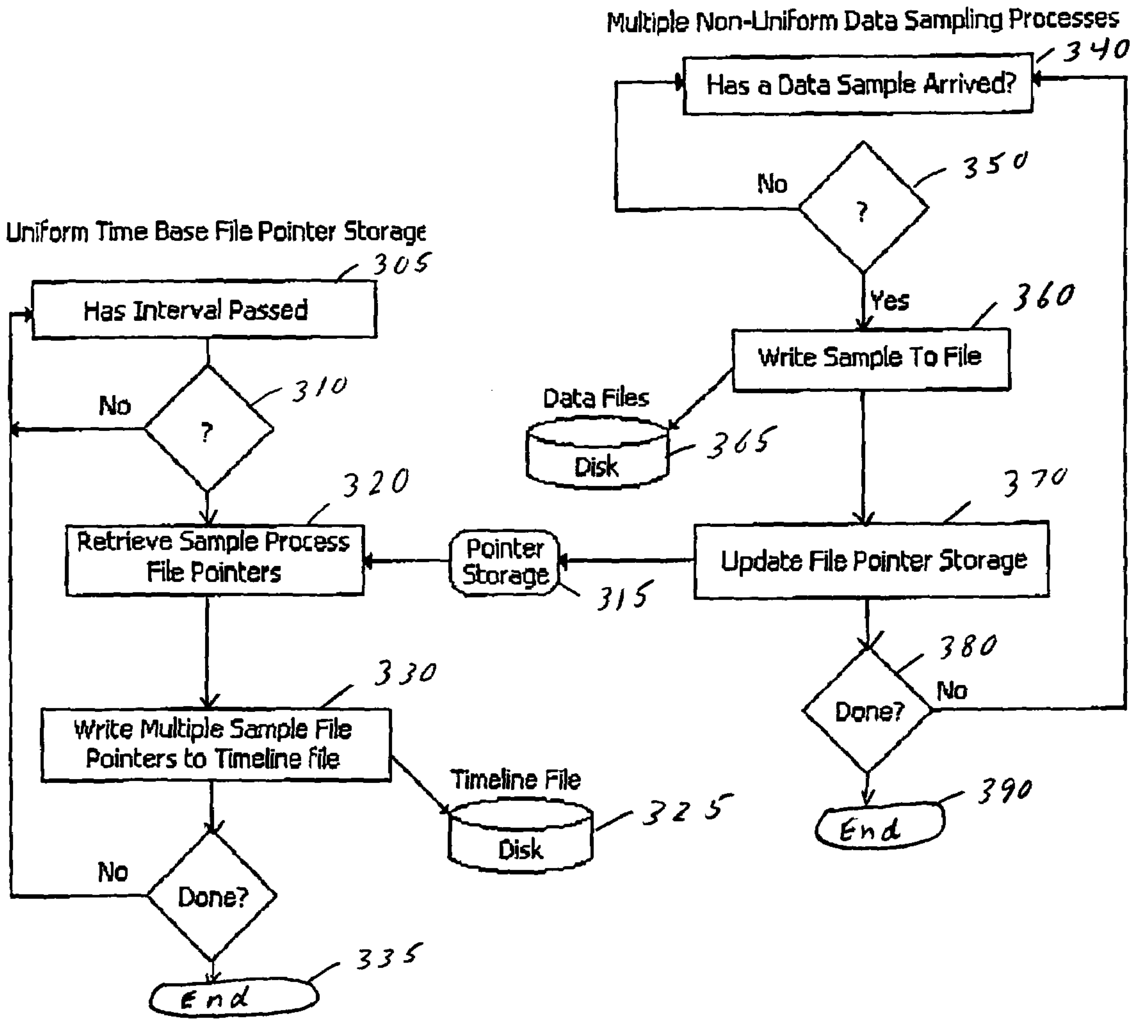
FIG. 3 is a flow chart showing a data recording process, according to an embodiment of the invention.

FIG. 3 is a flow chart showing a random access recording process in accordance with a first embodiment of the invention. With respect to a non-uniform data sampling process in accordance with the first embodiment, in step 350, it is determined whether or not a data sample has arrived. If No, the process returns to step 340. If Yes, the process goes to step 360, to write the sample to the appropriate data file, whereby the data file is stored in a memory 365. In step 370, the file pointer storage 315 is updated. In step 380, a determination is made as to whether or not the data sampling is complete for the particular sample being recorded. If No (Not Done), the process returns to step 340, to await the next data sample. If Yes (Done), the process ends in step 390.

With respect to the Uniform Time Base File Pointer Storage in accordance with the first embodiment of the invention, in step 310, it is determined whether or not a predetermined time interval (e.g., 1 second) has passed. If No, the process returns to step 305. If Yes, in step 320, sample process file pointers are retrieved from the file pointer storage 315. In step 330, multiple sample file pointers are written into the timeline file, based on information obtained from a timeline file stored in a data storage 325. When all of the file pointers are written to the timeline file for that particular interval (Done=Yes), the process ends in step 335; otherwise (Done=No), the process returns to step 305.

Figure 4:
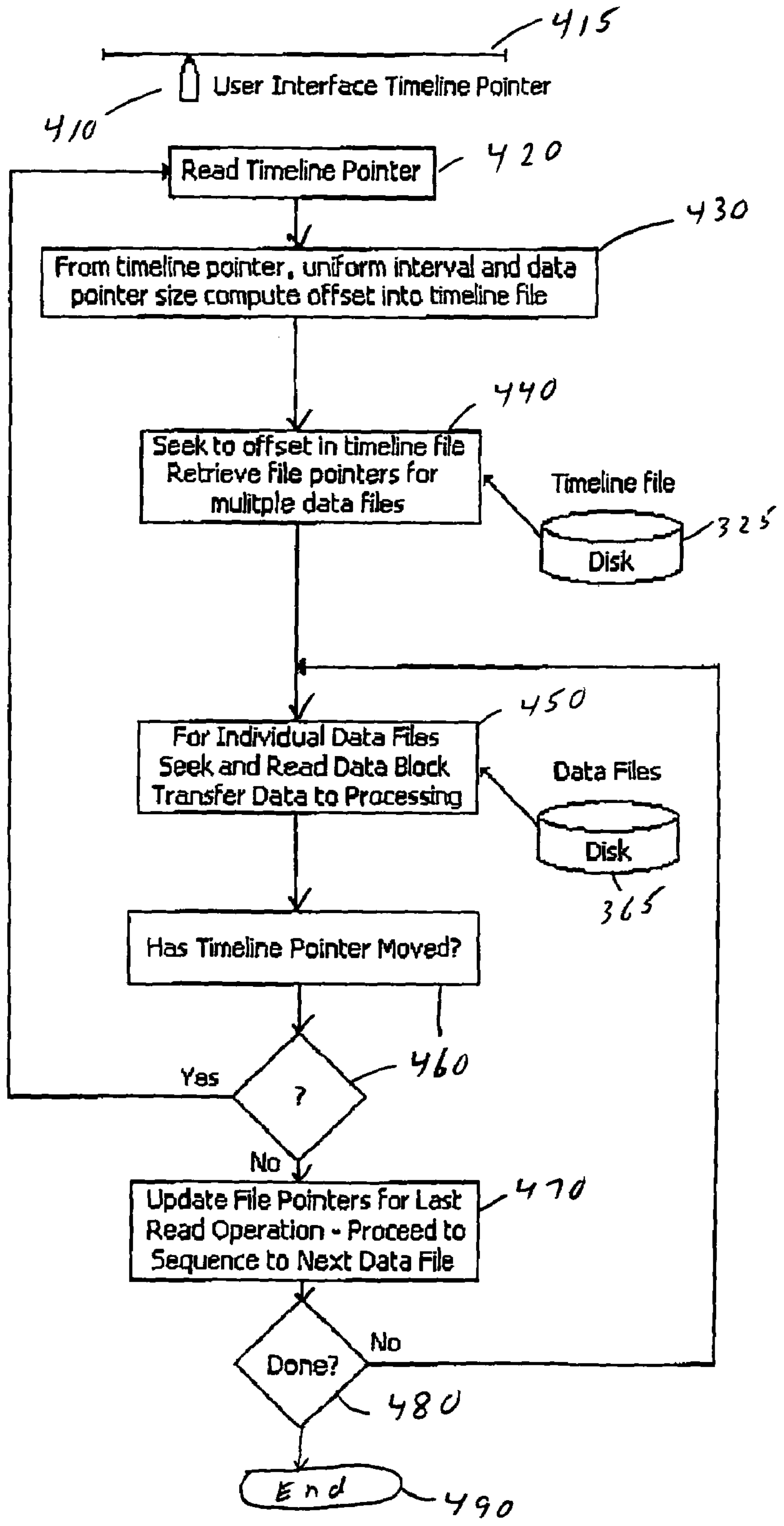
FIG. 4 is a flow chart showing a random access playback process, according to an embodiment of the invention.

FIG. 4 is a flow chart showing a random access playback process in accordance with a first embodiment of the invention. At the top of FIG. 4 is shown a user interface time pointer 410, which the user can access by way of a GUI screen (see also FIG. 2), in order to playback a particular data file or data files from a particular portion of a flight (via movement of the pointer 410 on the time line 415), in a random access manner. In step 420, a timeline pointer is read based on the current position of the timeline pointer on the GUI screen. From the timeline pointer, in step 430, and based on the uniform interval and data pointer size, there is computed an offset into the timeline file. In step 440, based on the offset computed for the timeline file, file pointers for one or more data files are retrieved from the timeline file (which is accessed from its storage location on disk 325). In step 450, for each individual data file, there is performed a process of seek (fseek) and read data blocks for these data files, and that data is transferred for processing. The data files are accessed from their storage locations in memory 365. In step 460, it is determined if the timeline pointer has moved. If No, the process continues to step 470, whereby the file pointers are updated for the last read operation, and whereby it proceeds to sequence to the next data file. If Yes, the process returns to step 420, to read the current timeline pointer. In step 480, it is determined if the playback process is complete. If No, the process returns to step 450 to read the next data file, and if Yes, the process ends in step 490.

Figure 5:
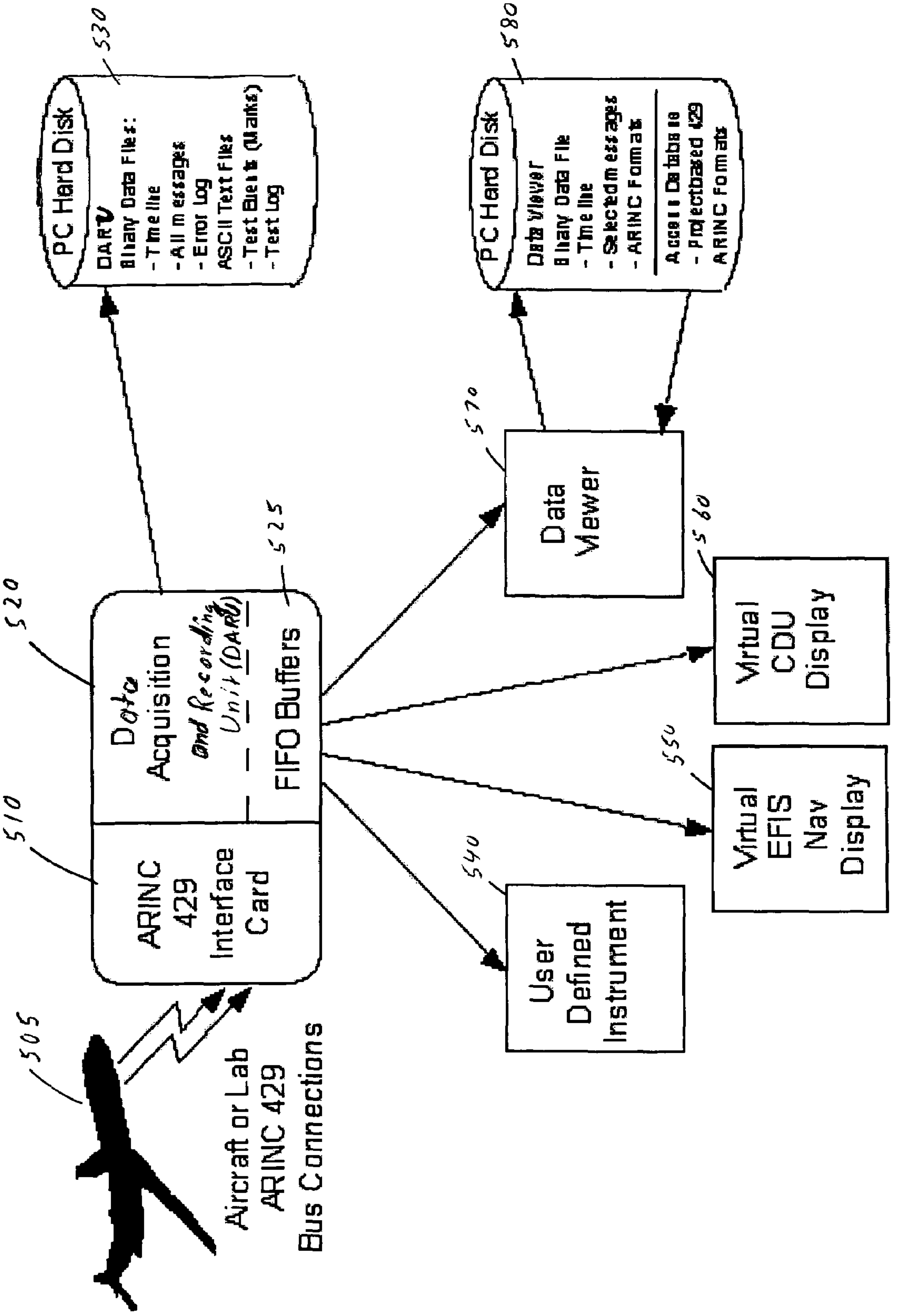
FIG. 5 is a block diagram showing a data acquisition system according to an embodiment of the invention.

FIG. 5 is a diagram showing a data acquisition recording system in accordance with a second embodiment of the invention. In FIG. 5, aircraft data is obtained from various components of an aircraft 505 by way of ARINC 429 interface cards 510. Each interface card 510 communicates with a data acquisition and recording unit 520 that includes buffers 525. The data acquisition and recording unit 520 provides for random access storage of aircraft data from a plurality of data channels, such as described above with respect to the first embodiment. The data acquisition and recording unit 520 is preferably implemented as a software application that resides on a PC hard disk 530. The PC hard disk 530 also stores binary data files, whereby each data file can be accessed from timeline information, and whereby messages and error logs are also stored on the PC hard disk 530. Furthermore, test breaks (marks) and test logs are preferably stored on the PC hard disk 530. The buffers 525 provide for data to be sent to one of a plurality of data outputs, including a User Defined Instrument 540, a Virtual EFIS Navigation Display 550, a Virtual CDU Display 560, and a Data Viewer 570. Thus, a user can review the avionics data to be provided in a particular format to suit the user. The Data Viewer 570 is preferably a software application that is stored on a PC hard disk 580, and whereby the Data Viewer 570 allows the user to view the data files in a timeline, random access manner, as described above with respect to the first embodiment. The PC hard disk 580 also stores binary data files, including timelines data, selected messages, and various ARINC formats. Also, an ACCESS database is preferably stored on the PC hard disk 580, along with various ARINC formats.

FIG. 6 is a diagram showing a data acquisition playback system in accordance with a third embodiment of the invention. In FIG. 6, a timeline navigation unit 605 allows for avionics data to played back using a point-and-click interface (e.g., a computer mouse). The timeline navigation unit 605 is preferably implemented as a software application, referred to in FIG. 6 as "Replay Software" 610. The data can be paused or rewound to suit the user, by the user moving the timeline icon on a GUI display. Further, the user can jump to a particular point in time on an aircraft's flight, again by moving the timeline icon to a particular location on the GUI display. The data can be played in real-time, or at a faster rate, such as 2×, 4×, or 8×, in one possible implementation of the third embodiment. The same types of data output displays as shown in FIG. 5 are included in the playback system of FIG. 6, whereby there is also provided a capability for custom plots 660 (e.g., EXCEL plots), and Matlab plot files (scripts) 670 that receive the processed random access avionics data from a data post processor 690, which interface with Replay Software Application 610 via First In First Out (FIFO) Buffers 620. The Replay Software application 610 is preferably stored in a PC Hard Disk 630, whereby the PC Hard Disk 630 also stores binary data files (timeline, all messages, error logs) and ASCII text files (test events and test logs). A PC Hard Disk 680 stores a software application corresponding to the Data Viewer 570, whereby the PC Hard Disk 680 also stores binary data files (timeline, selected messages, ARINC formats), an Access Database, and ARINC formats.

Many other changes and modifications may be made to the present invention without departing from the spirit thereof. The scope of these and other changes will become apparent from the appended claims. For example, the elements described with regards to the embodiments of the present invention may be implemented in software being run on a general purpose computer or by a special purpose computer, and/or by application specific integrated circuits (ASICs) or field programmable gate arrays (FPGAs), or a combination thereof.

What is claimed is:

1. A random access recording method for recording and playing back avionics data, comprising:

(a) storing data received from a plurality of data channels into each channels' respective data file, wherein data storage occurs in the same data format it is received from said plurality of data channels and data can be received at various data fill rates;

(b) storing timeline pointers in a timeline pointer file that signifies when the data from said plurality of data channels was stored;

(c) determining a particular position of a timeline icon provided on a graphical user interface (GUI) display, the timeline icon signifying a point in time that a user desires to review avionics data stored in step a); and (d) retrieving and playing back data stored based on the particular position of the timeline icon with respect to corresponding values of the timeline pointers stored in step b), wherein data retrieval does not depend upon the particular data format.

2. The method according to claim 1, wherein the data is provided in accordance with ARINC 429 standard.

3. The method according to claim 1, further comprising: prior to step c), receiving input, from the user, of a movement of the timeline icon on the GUI display.

4. The method according to claim 1, wherein step a) further comprises:

a1) inputting data from a plurality of data channels; and a2) storing the respective data from the plurality of data channels into each channel' respective data file.

5. The method according to claim 4, wherein the respective data files are stored in a file folder that includes date and time information for accessing the file folder.

6. The method according to claim 4, wherein the respective data files and the timeline pointer file are stored in a file folder that includes the date and time information for accessing the file folder.

7. The method according to claim 6, wherein step d) comprises:

d1) determining a time offset from a beginning of a data collection session;

d2) dividing the time offset by a timeline offset file period to find an index to a timeline file stored in a memory; and d3) opening the timeline file and searching for a timeline record corresponding to the time offset; and d4) reading respective time-tag indices from the timeline file based on the timeline record; and d5) opening each respective channel file and searching for data blocks stored therewithin; and d6) sequentially reading out data from each respective channel file that has data, staffing at a point of time corresponding to the time-tag indices.

8. The method according to claim 6, further comprising:

b0) updating the timeline pointers based on a current time value, wherein the timeline pointers are updated periodically prior to being stored in step b).

9. The method according to claim 1, wherein step a) comprises:

a1) receiving a data sample from at least one data channel of a plurality of data channels;

a2) writing the data sample to a corresponding data file stored in a file folder;

a3) updating a file pointer in a file pointer file stored in the file folder, the file pointer file indicating a point of time at which the corresponding data sample was received.

10. The method according to claim 1, wherein step d) comprises:

d1) determining a time offset from a beginning of a data collection session;

d2) dividing the time offset by a timeline offset file period to find an index to a timeline file stored in a memory; and d3) opening the timeline file and searching for a timeline record corresponding to the time offset; and d4) reading respective time-tag indices from the timeline file based on the timeline record; and d5) opening each respective channel file and searching for data blocks stored therewithin; and d6) sequentially reading out data from each respective channel file that has data, staffing at a point of time corresponding to the time-tag indices.

11. The method according to claim 1, wherein the data stored in step a) is capable of being stored in a non-sequential manner with respect to the respective time pointers of the data, and wherein the data is capable of being played back in step d) in a random access manner.

12. A system for recording and playing back of avionics data, comprising:

a storing unit configured to store data received from a plurality of data channels into each channels' respective data file, wherein data storage occurs in the same data format it is received from said plurality of data channels and data can be received at various data fill rates, the storing unit also configured to store timeline pointers into a timeline pointer file that signifies when the data from the respective plurality of data files was stored;

a determining unit configured to determine a particular position of a timeline icon provided on a graphical user interface (GUI) display, the timeline icon signifying a point in time that a user desires to review avionics data stored in the storing unit; and a playback unit configured to retrieve and play back data stored based on the particular position of the timeline icon with respect to corresponding values of the timeline pointers stored in the storing unit, wherein data retrieval does not depend upon the particular data format.

13. The system according to claim 12, wherein the data is provided in accordance with ARINC 429 standard.

14. The system according to claim 12, further comprising:

an input unit configured to input data that represents a movement of the timeline icon on the GUI display by the user.

15. The system according to claim 12, wherein the storing unit is configured to receive data from a plurality of data channels, and wherein the storing unit is configured to store the respective data from the plurality of data channels into each channels' respective data files.

16. The system according to claim 15, further comprising a file directory that includes at least one file folder, wherein the respective data files are stored in the at least one file folder that includes date and time information for accessing the file folder.

17. The system according to claim 16, wherein the respective data files and the timeline pointer file are stored in the at least one file folder.

18. The system according to claim 17, further comprising:

an updating unit configured to update the timeline pointers based on a current time value, wherein the timeline pointers are updated periodically by the updating unit prior to being stored in the timeline pointer file.

19. The system according to claim 12, wherein the playback unit plays back the data stored by:

d1) determining a time offset from a beginning of a data collection session;

d2) dividing the time offset by a timeline offset file period to find an index to a timeline file stored in a memory; and d3) opening the timeline file and searching for a timeline record corresponding to the time offset; and d4) reading respective time-tag indices from the timeline file based on the timeline record; and d5) opening each respective channel file and searching for data blocks stored therewithin; and d6) sequentially reading out data from each respective channel file that has data, staffing at a point of time corresponding to the time-tag indices.

20. The system according to claim 12, wherein the data stored in the storing unit is capable of being stored in a non-sequential manner with respect to the respective time pointers of the data, and wherein the data is capable of being played back by the playback unit in a random access manner.

21. A computer readable memory having a data structure implementation a capacity for recording and playing back of avionics data, comprising:

means for storing data received from a plurality of data channels into each channels' respective data file, wherein data storage occurs in the same data format it is received from said plurality of data channels and data can be received at various data fill rates;

means for storing timeline pointers into a timeline pointer file that signifies when the data from said plurality of data channels was stored;

means for determining a particular position of a timeline icon provided on a graphical user interface (GUI) display, the timeline icon signifying a point in time that a user desires to review avionics data stored by the data storing means; and means for retrieving and playing back data stored based on the particular position of the timeline icon with respect to corresponding values of the timeline pointers stored in the storing unit, wherein data retrieval does not depend upon the particular data format.

22. The computer readable memory according to claim 21, wherein the data is provided in accordance with ARINC 429 standard.

23. The computer readable memory according to claim 21, further comprising:

means for receiving input, from the user, of a movement of the timeline icon on the GUI display.

24. The computer readable memory according to claim 21, wherein the data storing means further comprises:

means for inputting data from a plurality of data channels; and means for storing the respective data from the plurality of data channels into each channels' respective data file.

25. The computer readable memory according to claim 24, wherein the respective data files are stored in a file folder that includes date and time information for accessing the file folder.

26. The computer readable memory according to claim 24, where wherein the respective data files and the timeline pointer file are stored in a file folder that includes date and time information for accessing the file folder.

27. The computer readable memory according to claim 26, further comprising:

updating means for updating the timeline pointers based on a current time value, wherein the timeline pointers are updated periodically by the updating means prior to being stored in the timeline pointer file.

28. The computer readable memory according to claim 21, wherein playback means play back the data stored by:

d1) determining a time offset from a beginning of a data collection session;

d2) dividing the time offset by a timeline offset file period to find an index to a timeline file stored in a memory; and d3) opening the timeline file and searching for a timeline record corresponding to the time offset; and d4) reading respective time-tag indices from the timeline file based on the timeline record; and d5) opening each respective channel file and searching for data blocks stored therewithin; and d6) sequentially reading out data from each respective channel file that has data, staffing at a point of time corresponding to the time-tag indices.

29. The computer readable memory according to claim 21, wherein the data stored in the storing means is capable of being stored in a non-sequential manner with respect to the respective time pointers of the data, and wherein the data is capable of being played back by the playing back means in a random access manner.

* * * * *